Patented Mar. 7, 1933

1,900,132

UNITED STATES PATENT OFFICE

LUDWIG ROSENSTEIN, OF SAN FRANCISCO, CALIFORNIA

PROCESS OF REFINING

No Drawing.   Application filed April 20, 1931.   Serial No. 531,650.

This invention relates to a process for the refining of natural organic products such as vegetable and animal oils, fats, waxes and the like, as cocoanut oil, cotton seed oil, and fish oil.

This application is a continuation in part of my application Serial Number 413,429, filed December 11, 1929.

It is the broad object of my invention generally to provide a process which may be more advantageously employed, than the processes heretofore utilized, for the refining of such natural organic products.

The invention possesses numerous other advantageous features and objects, some of which, with the foregoing, will appear in full in the following description where I have outlined a preferred practice according to my invention. It is understood that the invention, as defined by the claims, is to be accorded a range of mechanical and chemical equivalents consistent with the state of the prior art.

It is my discovery that certain organic materials, which for the present purposes of the invention can be considered the equivalents of vegetable oils, as will presently appear, can be refined of impurities comprising usually free fatty acids, coloring matter, aldehydes and other substances by the use of liquid ammonia. These oleaginous bodies of vegetable or animal origin when in the liquid state are substantially immiscible with liquid ammonia. Since the free fatty acids and other impurities usually occurring in the oleaginous bodies are soluble in the liquid ammonia, they are readily removed from oleaginous material by bringing it into contact with liquid ammonia. The process therefore comprises essentially the contacting of crude oleaginous bodies of vegetable or animal origin, in the liquid state with liquid ammonia, the impurities being absorbed by the ammonia phase which may then be mechanically separated from the oleaginous phase. The liquid ammonia containing the impurities is placed in a suitable apparatus such as a still from which the ammonia may be evaporated and condensed substantially free from the impurities. The free fatty acids and other impurities remain in the apparatus while the pure liquid ammonia is recovered for reuse.

As an example of how the process of my invention may be utilized in connection with an oil such as cocoanut oil I will set forth the following by way of illustration only. Crude cocoanut oil containing about 6% or over free fatty acids, together with the other impurities usually occurring, is treated with an approximately equal volume of liquid ammonia in an apparatus capable of bringing the oil and ammonia into thorough contact. The temperature at which the contacting is effected is preferably relatively low but above the melting point of the oil so that the organic material is preferably in the liquid phase. I have found that temperatures of approximately 35° to 40° C. are suitable. The pressure maintained is that of liquid ammonia at the temperature chosen.

As the ammonia is contacted with the oleaginous material in the liquid state substantially all the free fatty acids and other impurities are absorbed by the ammonia phase. In effecting the contacting counter-current methods are preferably employed although other manners of contacting and batch operation can be employed. In some cases, where the free fatty acid content of the crude oleaginous material is high, or where the percentage of impurities is appreciable, a second and even a third extraction may be desirable.

Following the extraction of the impurities, the oleaginous material and ammonia, which are substantially immiscible, are separated. Oleaginous material treated with the process of my invention does not require subsequent filtration through a decolorizing medium, being generally acceptable to the trade as produced. This is a distinct advantage over present refining methods where the oils and related materials are treated with an alkali such as sodium hydroxide or sodium carbonate in aqueous solution and following which treatment it is usually necessary to further purify the oil by filtration through such mediums as absorbent carbon, fuller's earth or some form of decolorizing clay.

In some instances it may be desirable to wash the oleaginous material removed from contact with the ammonia with water to remove traces of ammonia or ammonium soaps from the oleaginous material. In this connection, warming the oleaginous material in a vacuum or with a current of inert gas to expel the last traces of ammonia can also be employed.

The ammonia removed from contact with the oleaginous material and containing the free fatty acids and impurities is placed in a suitable apparatus such as a still where it is evaporated and recovered by condensing. The free fatty acids and other impurities remain in the still and are available for recovery if desired.

In general, the time of contact between the oleaginous material phase and liquid ammonia phase is preferably relatively short as I have found that the rate at which the impurities pass into the ammonia phase is very rapid. In fact, long continued contact should be avoided as it gives rise to the formation of the amides of the oil acids and glycerine. I have found a period of a few minutes usually sufficient in this respect.

While I have disclosed the process of my invention in connection with an oil such as cocoanut oil, this is only one of the particularly valuable uses of the invention. Other vegetable oils as well may be advantageously treated, as may fats which, when heated above their melting points, can be considered as oils. Also, oils such as fish oil of animal origin may be treated.

The expression "oleaginous body of vegetable or animal origin" as used in the specification is meant to comprehend generally as equivalents for the purposes of the invention, those bodies frequently classified as oils, fats, waxes and resins; shellac being exemplary of resinous material.

By the term "liquid ammonia" is meant the liquid ammonia of commerce which is substantially 100% $NH_3$ or anhydrous, but may contain traces of moisture and other impurities.

I claim:

1. In a process of purifying a substance of the class consisting of oils, fats, waxes and resins of animal or vegetable origin, the step which comprises treating a mass of said substance with liquid ammonia.

2. In a process of purifying a substance of the class consisting of oils, fats, waxes and resins of animal or vegetable origin, the step which comprises treating a mass of said substance with liquid ammonia at a temperature at which the substance is a liquid.

3. The process of purifying a substance of the class consisting of oils, fats, waxes and resins of animal or vegetable origin containing impurities which comprises extracting the impurities from a mass of said substance by contacting with liquid ammonia, and substantially removing the ammonia containing extracted impurities from the contacted mass.

4. In a process of purifying a substance of the class consisting of oils, fats, waxes and resins of animal or vegetable origin containing impurities the step which comprises contacting a mass of said substance with liquid ammonia for a relatively short time to transfer impurities from the contacted mass to the ammonia.

5. In a process of purifying a substance of the class consisting of oils, fats, waxes and resins of animal or vegetable origin containing impurities and constituents reacting with ammonia the step comprising contacting a mass of said substance with liquid ammonia to remove substantially the impurities to the liquid ammonia, the time of contact being relatively short so that reaction between constituents of the contacted mass reacting with the liquid ammonia is substantially obviated.

6. The process of purifying a substance of the class consisting of oils, fats, waxes and resins of animal or vegetable origin containing impurities which comprises contacting a mass of said substance with liquid ammonia to transfer the impurities from the contacted mass to the ammonia, and separating the liquid ammonia containing the impurities substantially from the contacted mass.

7. The cyclic process of treating a substance of the class consisting of oils, fats, waxes and resins of animal or vegetable origin containing impurities comprising contacting a mass of said substance with liquid ammonia to extract impurities from the contacted mass, removing the ammonia from the contacted mass, and recovering the ammonia for reuse.

8. The process of removing impurities from a substance of the class consisting of oils, fats, waxes and resins of animal or vegetable origin which comprises bringing substantially liquid ammonia into intimate contact with a mass of said substance, the ammonia and the contacted mass being substantially immiscible so that an oleaginous phase and a liquid ammonia phase are present, the contacting being effected under sufficient pressure to maintain the ammonia substantially in the liquid phase so that impurities in the contacted substance are removed from the oleaginous phase to the liquid ammonia phase, and mechanically separating the liquid ammonia phase containing the removed impurities from contact with the mass of substance.

In testimony whereof, I have hereunto set my hand.

LUDWIG ROSENSTEIN.